(12) United States Patent
Chang (10) Patent No.: US 11,825,044 B2
(45) Date of Patent: Nov. 21, 2023

(54) DOCUMENT SCANNING DEVICE WITH DETACHABLE PRESSER ASSEMBLY

(71) Applicant: AVISION INC., Hsinchu (TW)

(72) Inventor: Min Hao Chang, Taipei (TW)

(73) Assignee: AVISION INC., Hsinchu (TW)

( * ) Notice: Subject to any disclaimer, the term of this patent is extended or adjusted under 35 U.S.C. 154(b) by 307 days.

(21) Appl. No.: 17/489,178

(22) Filed: Sep. 29, 2021

(65) Prior Publication Data

US 2022/0159137 A1    May 19, 2022

(30) Foreign Application Priority Data

Nov. 17, 2020   (TW) ................................ 109140011

(51) Int. Cl.
| | | |
|---|---|---|
| H04N 1/04 | (2006.01) | |
| H04N 1/00 | (2006.01) | |
| H04N 1/10 | (2006.01) | |

(52) U.S. Cl.
CPC ..... H04N 1/00551 (2013.01); H04N 1/00018 (2013.01); H04N 1/1061 (2013.01); *H04N 2201/0422* (2013.01)

(58) Field of Classification Search
CPC ........... H04N 1/00551; H04N 1/00018; H04N 1/1061; H04N 2201/0422
USPC ................................. 358/497, 474; 399/380
See application file for complete search history.

(56) References Cited

U.S. PATENT DOCUMENTS

| | | | | |
|---|---|---|---|---|
| 5,790,211 | A * | 8/1998 | Seachman | H04N 1/00795 349/113 |
| 6,587,233 | B1 * | 7/2003 | Salgado | H04N 1/00551 358/488 |
| 6,930,804 | B2 * | 8/2005 | Farrell | H04N 1/00737 382/199 |
| 10,623,599 | B2 * | 4/2020 | Kakuda | H04N 1/107 |
| 2006/0245010 | A1 * | 11/2006 | Kashimada | H04N 1/00551 358/474 |
| 2016/0269583 | A1 | 9/2016 | Kamisoyama et al. | |
| 2018/0307173 | A1 | 10/2018 | Chang et al. | |
| 2019/0007576 | A1 | 1/2019 | Lui et al. | |

FOREIGN PATENT DOCUMENTS

| | | |
|---|---|---|
| TW | 534554 | 5/2003 |
| TW | M546063 U | 7/2017 |
| TW | M550002 U | 10/2017 |

* cited by examiner

*Primary Examiner* — Cheukfan Lee
(74) *Attorney, Agent, or Firm* — Muncy, Geissler, Olds & Lowe, P.C.

(57) ABSTRACT

In a document scanning device, a flatbed scanner has a transparent platen for supporting a document, and performs flatbed scanning on the document, a cover operable and closeable relatively to the flatbed scanner is pivotally connected to the flatbed scanner, and a presser assembly is detachably disposed on a lower surface of the cover. The presser assembly has a first pressing plane and a second pressing plane opposite to each other. The cover and the presser assembly respectively have detachable docking structures disposed between the first pressing plane and the second pressing plane, so that a user can detach the presser assembly from the lower surface of the cover, or attach the presser assembly to the lower surface of the cover, and that the first pressing plane and the second pressing plane can directly press the document onto the transparent platen of the flatbed scanner in two different used states.

12 Claims, 6 Drawing Sheets

DOCUMENT SCANNING DEVICE WITH DETACHABLE PRESSER ASSEMBLY

CROSS-REFERENCE TO RELATED APPLICATIONS

This application claims priority of No. 109140011 filed in Taiwan R.O.C. on Nov. 17, 2020 under 35 USC 119, the entire content of which is hereby incorporated by reference.

BACKGROUND OF THE INVENTION

Field of the Invention

This disclosure relates to a document scanning device with a detachable presser assembly, and more particularly to a document scanning device having a detachable presser assembly to provide different backgrounds.

Description of the Related Art

When a conventional flatbed scanner is performing flatbed scanning, a user needs to place a document or an original on a transparent platen, and then cover an upper cover to press the document or original against the transparent platen to flatten the original or document. Usually, the upper cover is provided with a pressing member, which presses the original and further provides a background pattern. For example, a black pressing member provides a black background, so that when the document with black words on a white background is scanned, a processor can be used to effectively find out edges of the document and perform the automatic image cropping operation. On the other hand, a white pressing member provides the white background, so that when the document with white words on the black background is scanned, the processor can be used to effectively find out the edges of the document and perform the automatic image cropping operation. Alternatively, when the black pressing member is used to copy the document with the black words on the white background, it is possible to prevent black edges, which pertain to the black pressing member and do not pertain to contents of the documents, from being printed out so that the toner or ink can be saved.

The background provided by the pressing member of the conventional flatbed scanner is fixed, and the user cannot change the background color or pattern provided by the pressing member. Thus, when the original scanner is equipped with the black pressing member, the user cannot change the black pressing member and only can adhere the white background onto the black pressing member, and vice versa. Therefore, such the design cannot satisfy the user's diversified requirements.

BRIEF SUMMARY OF THE INVENTION

It is therefore an objective of this disclosure to provide a document scanning device with a detachable presser assembly to allow the user to switch or change the presser assembly rapidly to provide different backgrounds for the document scanning device or provide pressing planes having different properties for the documents having different properties. In addition, a flatbed scanner and a document processing device can be combined so that the document processing device is disposed on the cover to provide flatbed scanning and document printing (or sheet-fed document scanning) function concurrently.

To achieve the above-identified object, this disclosure provides a document scanning device including a flatbed scanner, a cover and a presser assembly. The flatbed scanner has a transparent platen for supporting a document, and performs flatbed scanning on the document. The cover is pivotally connected to the flatbed scanner and is openable and closeable relatively to the flatbed scanner. The presser assembly detachably disposed on a lower surface of the cover has a first pressing plane and a second pressing plane opposite to each other, and the cover and the presser assembly respectively have detachable docking structures disposed between the first pressing plane and the second pressing plane, so that a user can detach the presser assembly from the lower surface of the cover, or attach the presser assembly to the lower surface of the cover, and that the first pressing plane and the second pressing plane can directly press the document onto the transparent platen of the flatbed scanner in two different used states.

The document scanning device may further include a document processing device detachably disposed on an upper surface of the cover.

With the above-mentioned embodiment, the document scanning device has the detachable presser assembly and can provide different pressing backgrounds for the document(s) to make the subsequent image processing become easier, or provide pressing planes having different properties for the documents having different properties to adapt to different usage requirements. Furthermore, because the presser assembly can be disassembled, the document processing device can be disposed on the cover, then the presser assembly is disassembled, and then the document processing device is fastened to the cover to provide the firm mounting effect, and also make the document scanning device have the printing (or sheet-fed document scanning) function.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

Figure 1:
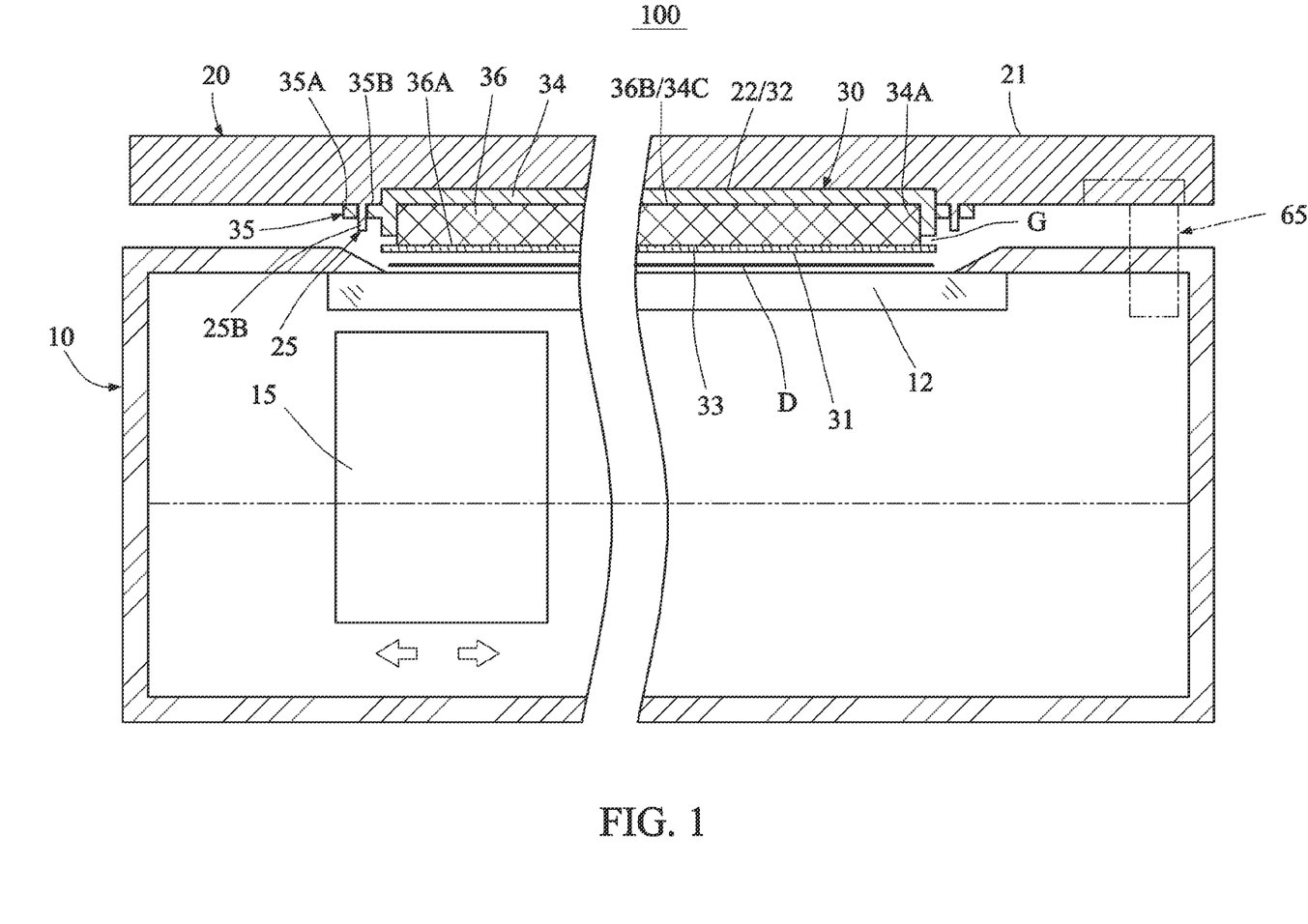
FIG. 1 is a schematically partially cross-sectional view showing a document scanning device with a detachable presser assembly according to a preferred embodiment of this disclosure.

FIG. 1 is a schematically partially cross-sectional view showing a document scanning device 100 according to a preferred embodiment of this disclosure. Referring to FIG. 1, the document scanning device 100 includes a flatbed scanner 10, a cover 20 and a presser assembly 30.

The flatbed scanner 10 has a transparent platen 12 for supporting a document D, and performs flatbed scanning on the document D. For example, the document D is placed on the transparent platen 12 of the flatbed scanner 10, and an optical scanning module 15 disposed under the transparent platen 12 can be moved leftward and rightward to acquire the image of the document D through the transparent platen 12. The optical scanning module 15 may be a scanning module having a charge-coupled device (CCD) type image sensor or a contact image sensor (CIS).

The cover 20 is pivotally connected to the flatbed scanner 10 and is openable and closeable relatively to the flatbed scanner 10. For example, the cover 20 is openably disposed on the flatbed scanner 10 through a hinge 65, so that the cover 20 is rotatable relatively to the flatbed scanner 10, and can be moved relatively to the flatbed scanner 10 in a vertical direction to adapt the cover 20 to documents with different thicknesses.

The presser assembly 30 is detachably disposed on a lower surface 22 of the cover 20. An upper surface 21 of the cover 20 is disposed opposite the lower surface 22. The presser assembly 30 has a first pressing plane 31 and a second pressing plane 32 opposite to each other. The cover 20 and the presser assembly 30 respectively have detachable docking structures 25 and 35 disposed between the first pressing plane 31 and the second pressing plane 32. A user can detach the presser assembly 30 from the lower surface 22 of the cover 20, or attach the presser assembly 30 to the lower surface 22 of the cover 20 through the detachable docking structures 25 and 35, so that the first pressing plane 31 and/or the second pressing plane 32 directly presses the document D onto the transparent platen 12 of the flatbed scanner 10 in two different used states with the docking structures 25 and 35 not touching the document D and the transparent platen 12. In FIG. 1, the first pressing plane 31 directly presses the document D onto the transparent platen 12. Because the detachable docking structures 25 and 35 are disposed between the first pressing plane 31 and the second pressing plane 32, the docking structures 25 and 35 cannot touch the document D and/or the transparent platen 12 when the presser assembly 30 is attached to the cover 20. Thus, the smooth pressing effect of the first pressing plane 31 and/or the second pressing plane 32 on the document D cannot be affected.

With the above-mentioned embodiment, it is possible to provide a document scanning device having the detachable presser assembly to provide different pressing backgrounds for the document(s) and to make the subsequent image processing become easier, or to provide pressing planes (e.g., the second pressing plane 32) having different properties for the documents having different properties. For example, a hard pressing plane (e.g., the first pressing plane 31) presses a flexible document, and a soft pressing plane presses a rigid document, so that the pressing flatness can be improved.

In addition, as shown in FIG. 1, the docking structures 25 and 35 may respectively include two positioning pins 25B and two positioning holes 35B of two lugs 35A, wherein each positioning pin 25B is inserted into the corresponding positioning hole 35B. It is worth noting that the docking structures 25 and 35 have only one positioning pin 25B and one positioning hole 35B to achieve the positioning effect.

Figure 2:
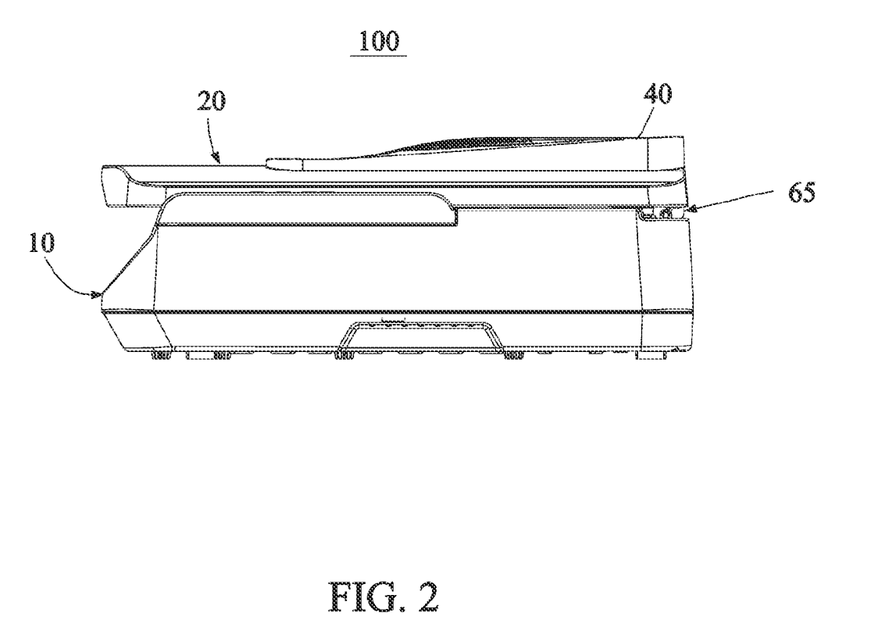
FIG. 2 is a side view showing a modified example of the scanner of FIG. 1.
Figure 3:
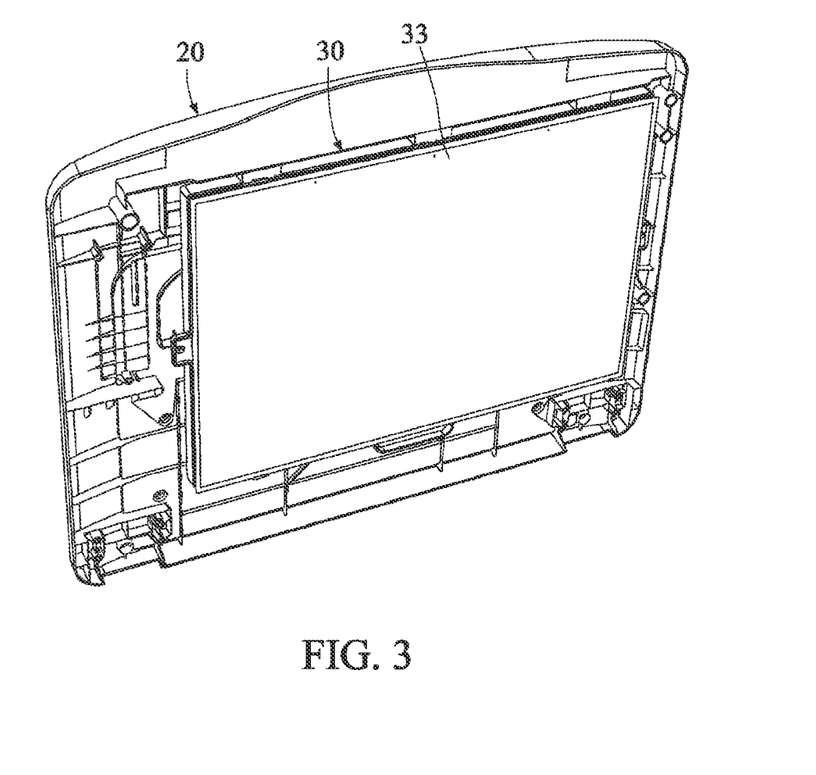
FIG. 3 is a pictorially assembled view showing a first used state of the cover and the presser assembly of FIG. 2.
Figure 4:
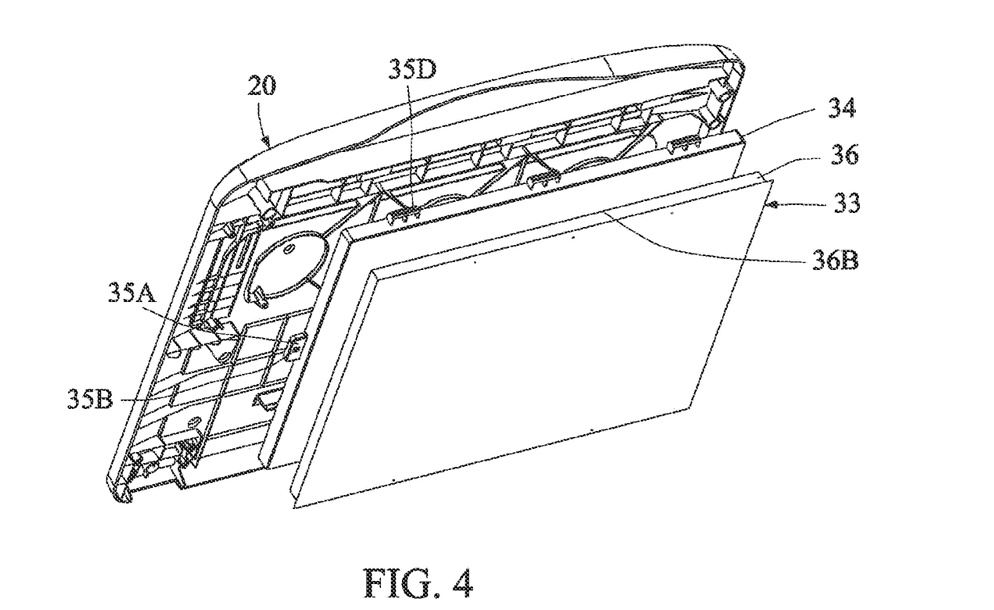
FIG. 4 is a pictorially exploded view showing the first used state of the cover and the presser assembly of FIG. 2.
Figure 5:
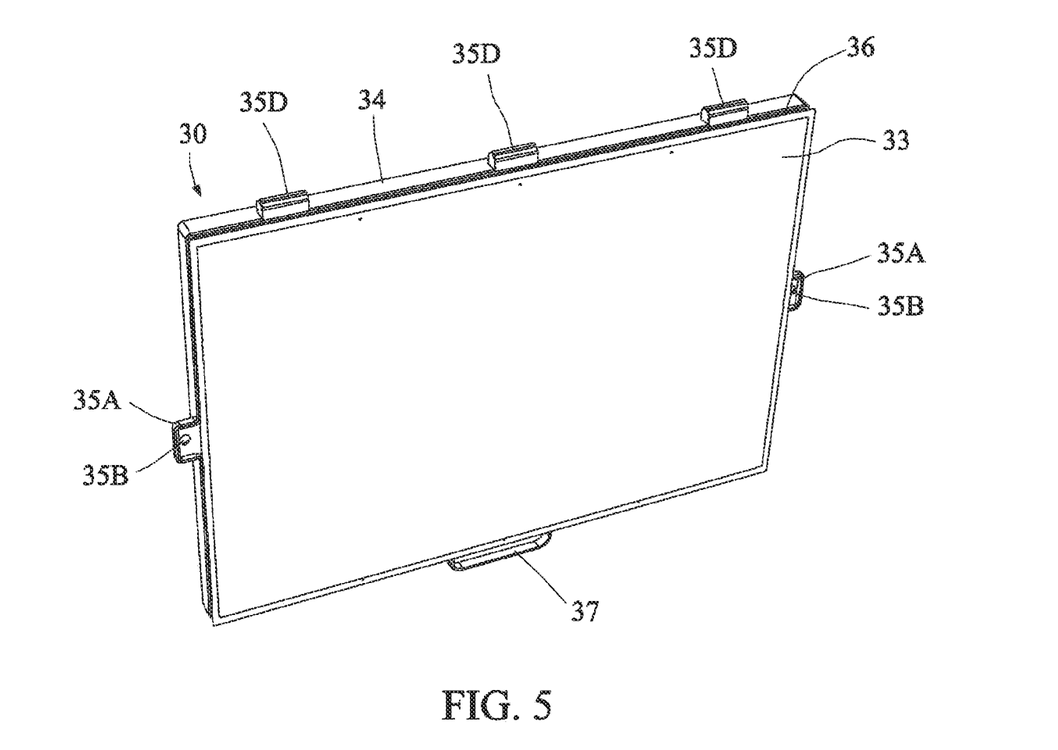
FIGS. 5 and 6 are pictorial views showing the presser assembly of FIG. 2 at two viewing angles.
Figure 6:
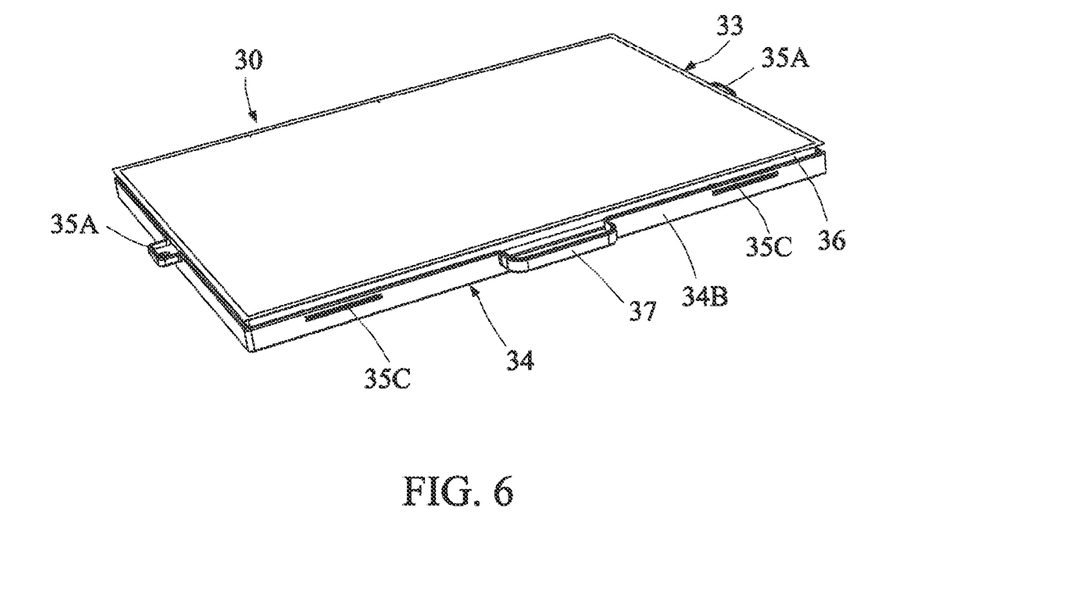
Figure 7:
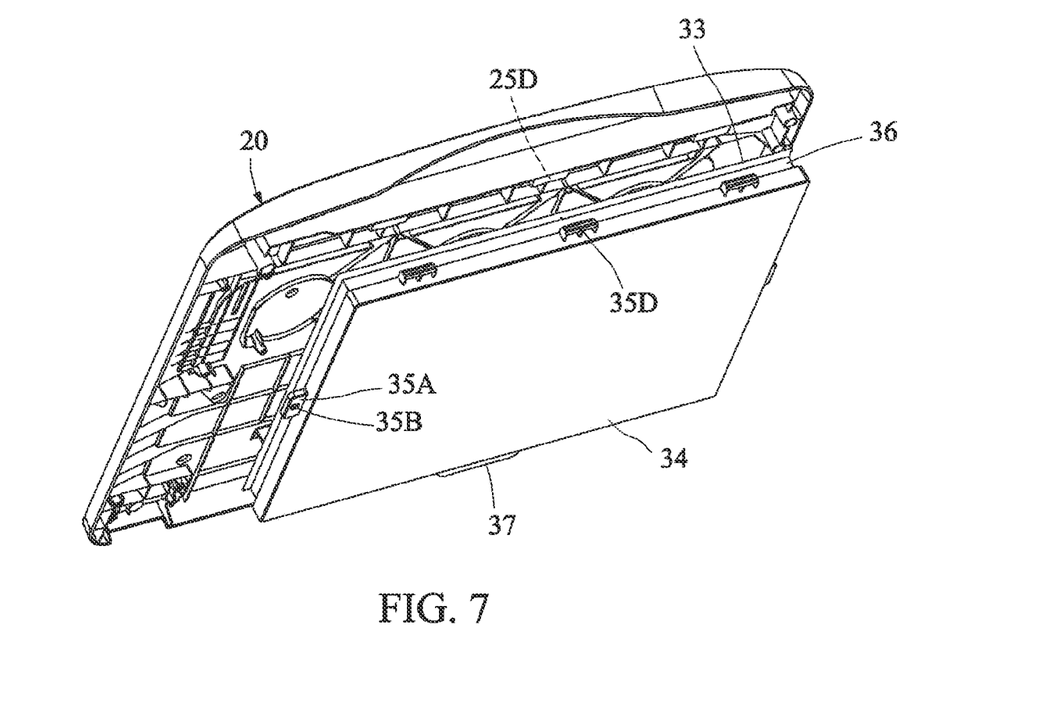
FIG. 7 is a pictorially exploded view showing a second used state of the cover and the presser assembly of FIG. 4.

FIG. 2 is a side view showing a modified example of the scanner of FIG. 1. FIG. 3 is a pictorially assembled view showing a first used state of the cover and the presser assembly of FIG. 2. FIG. 4 is a pictorially exploded view showing the first used state of the cover and the presser assembly of FIG. 2. FIGS. 5 and 6 are pictorial views showing the presser assembly of FIG. 2 at two viewing angles. FIG. 7 is a pictorially exploded view showing a second used state of the cover and the presser assembly of FIG. 4. Referring to FIGS. 1 to 7, the presser assembly 30 has a first background member 33 and a second background member 34 opposite to each other, so that the first background member 33 (see FIGS. 1 and 3) and/or the second background member 34 (see FIGS. 1 and 7) directly contacts the transparent platen 12 and the document D to selectively provide the first background member 33 and the second background member 34 having different properties for the document D. In this embodiment, the first background member 33 provides a white background being a soft pressing member, and the second background member 34 provides a black background being a hard pressing member formed by way of plastic injection molding. In another example, the first background member 33 may be the hard pressing member providing the white background, and the second background member 34 may be the soft pressing member providing the black background.

In addition, the presser assembly 30 may further have a buffer structure 36, such as a sponge. The first background member 33 and the second background member 34 are respectively attached to a first structure surface 36A and a second structure surface 36B of the buffer structure 36 opposite to each other. The buffer structure 36 is partially accommodated within a slot 34A of the second background member 34, the second structure surface 36B is entirely accommodated within the slot 34A, and the first structure surface 36A is disposed outside the slot 34A, so that the first background member 33 and the second background member 34 are separated from each other by a buffer gap G. The buffer gap G can provide the buffer effect when the cover 20 presses the document D to prevent the transparent platen 12 from being impacted and damaged. It is worth noting that the second structure surface 36B may be attached to a top surface 34C (FIG. 1) of the slot 34A, and the top surface 34C may have multiple ribs constituting discontinuous planes to decrease the material and weight of the second background member 34. Alternatively, the top surface 34C may have a smooth continuous plane without any limitation.

Figure 8:
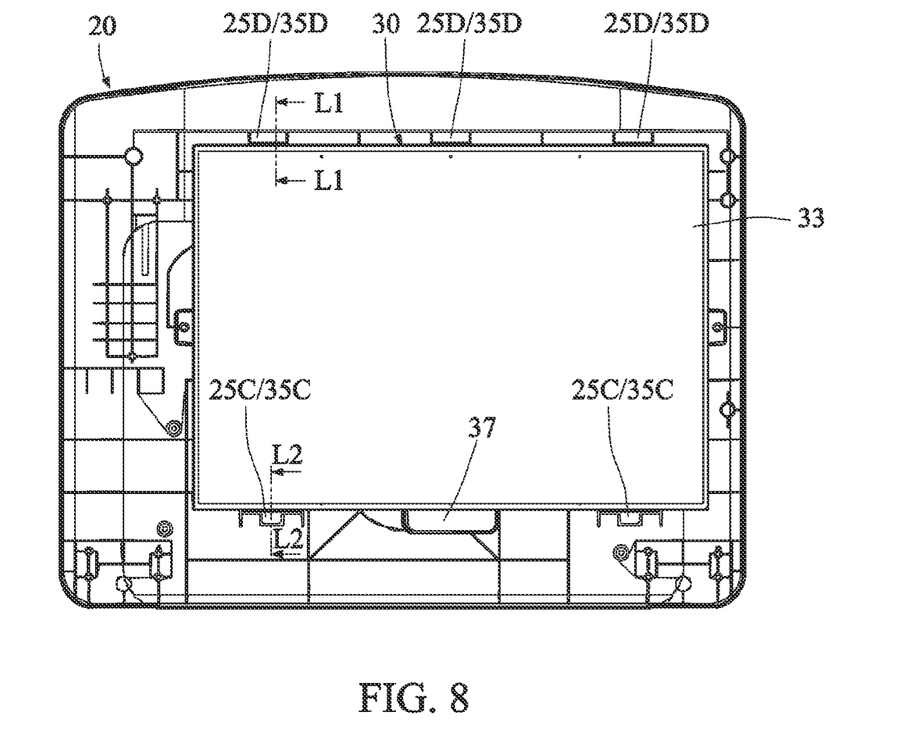
FIG. 8 is a bottom view showing the first used state of the cover and the presser assembly of FIG. 3.
Figure 9:
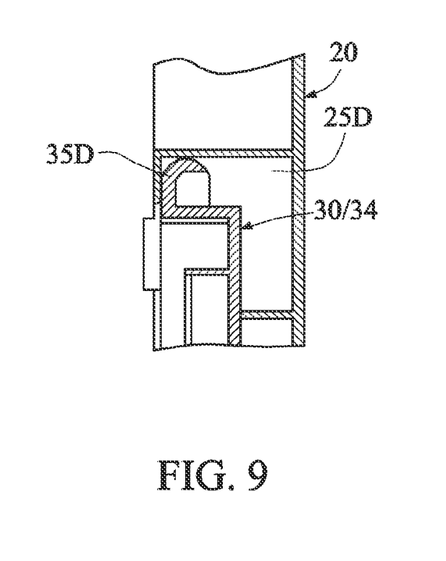
FIG. 9 is a partially cross-sectional view taken along a line L1-L1 of FIG. 8.

FIG. 8 is a bottom view showing the first used state of the cover and the presser assembly of FIG. 3. FIG. 9 is a partially cross-sectional view taken along a line L1-L1 of FIG. 8 without the buffer structure and the first background member to prevent the associated features from being blurred. Referring to FIGS. 8 and 9, the docking structures 25 and 35 respectively include a shaft receiving slot 25D and a shaft 35D engaged into the shaft receiving slot 25D. In this example, the shaft receiving slot 25D pertains to the cover 20, and the shaft 35D pertains to the presser assembly 30. In another example, it is also possible to configure the shaft receiving slot as pertaining to the presser assembly, and configure the shaft as pertaining to the cover as long as the docking and positioning functions can be achieved.

As shown in FIGS. 6 and 8, the presser assembly 30 further includes a handle 37 disposed on one side 34B of the second background member 34, and the user can detach and attach the presser assembly 30 using the handle 37. When the presser assembly 30 is being detached or attached, the user can grip the handle 37, and a gap is still kept between the handle 37 and the cover 20. So, the user's hand can easily hold the handle 37.

Figure 10:
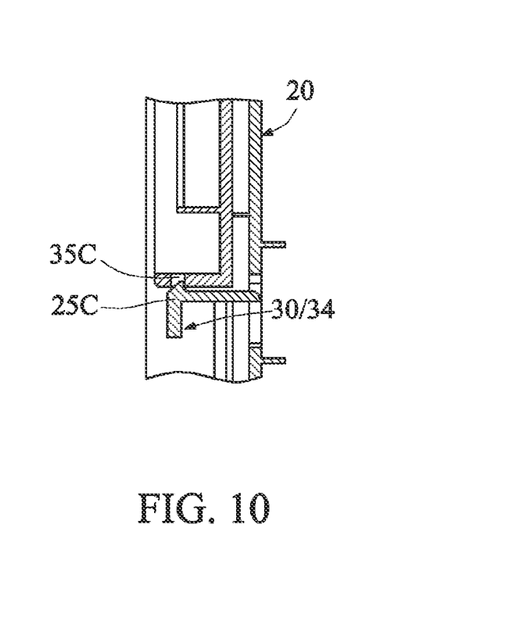
FIG. 10 is a partially cross-sectional view taken along a line L2-L2 of FIG. 8.

FIG. 10 is a partially cross-sectional view taken along a line L2-L2 of FIG. 8 without the buffer structure and the first background member to prevent the associated features from being blurred. Referring to FIGS. 6, 8 and 10, the docking structures 25 and 35 respectively include two resilient hooks 25C and two grooves 35C, wherein the resilient hook 25C is engaged into the groove 35C. In this example, the resilient hook 25C pertains to the cover 20, and the groove 35C pertains to the presser assembly 30. In another example, it is also possible to configure the resilient hook as pertaining to the presser assembly, and configure the groove as pertaining to the cover as long as the docking and positioning functions can be achieved. In addition, one single resilient hook 25C and one single groove 35C still can achieve the effect of this disclosure.

Referring to FIGS. 8 to 10, it is worth noting that the number of parts of each of the docking structures 25 and 35 may be adjusted according to the design requirement. Thus, the docking structures 25 and 35 respectively include: multiple shaft receiving slots 25D and multiple shafts 35D, wherein the shafts 35D are respectively engaged into the shaft receiving slots 25D; and multiple resilient hooks 25C and multiple grooves 35C, wherein the resilient hooks 25C are respectively engaged into the grooves 35C.

Figure 11:
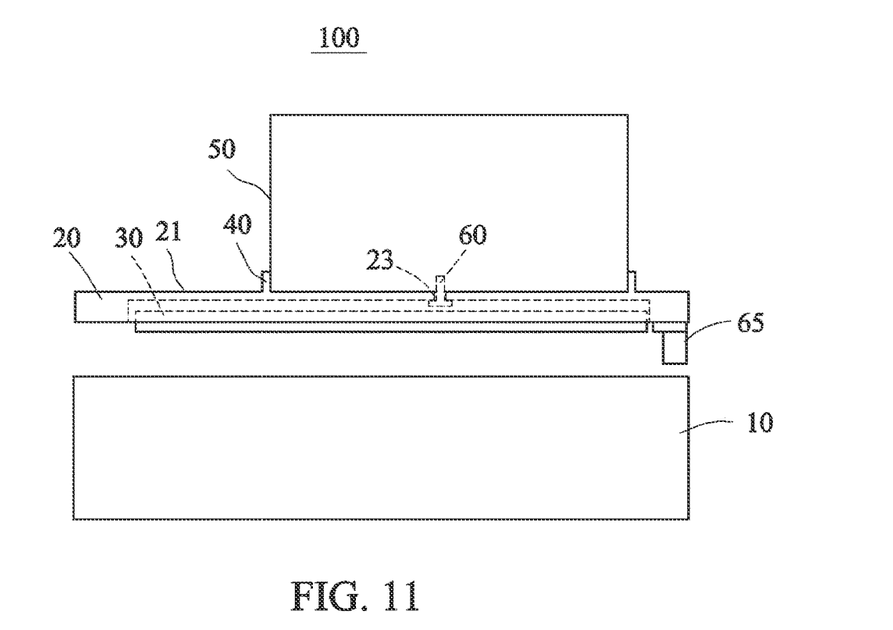
FIG. 11 is a front exploded view showing a modified example of the document scanning device of FIG. 1.
Figure 12:
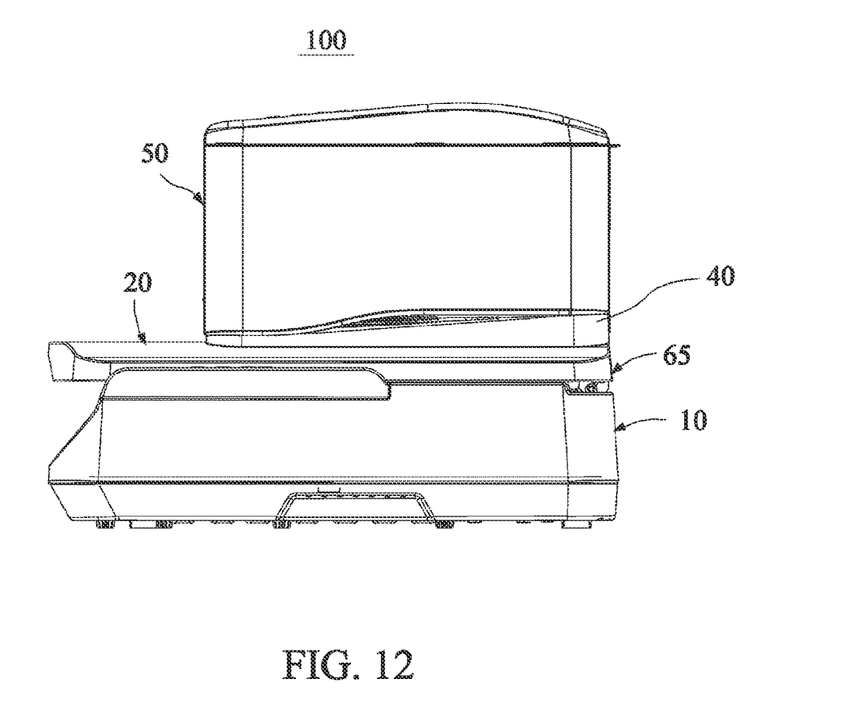
FIG. 12 is a front view showing a modified example of the document scanning device of FIG. 11.

FIG. 11 is a front exploded view showing a modified example of the document scanning device of FIG. 1. FIG. 12 is a front view showing a modified example of the document scanning device of FIG. 11. Referring to FIGS. 11 and 12, the document scanning device 100 may further include a document processing device 50 detachably disposed on the upper surface 21 of the cover 20. Thus, the document processing device 50 may be electrically connected to the flatbed scanner 10 to perform the document processing, such as document printing or document scanning (more particularly the sheet-fed document scanning different from the flatbed document scanning). Of course, the document processing device 50 may also be connected to the network or the computer to perform the network printing or network scanning, or perform the printing or scanning jobs requested by the computer.

In order to facilitate the installation of the document processing device 50, the document scanning device 100 may further include an installation positioning portion 40, which is disposed on the upper surface 21 of the cover 20 and for positioning the document processing device 50 to be installed. The installation positioning portion 40 may be a receiving slot formed by an annular or circumferential stopper wall, or another positioning structure (e.g., a quick release snap structure) fitting with the document processing device 50. In addition, the cover 20 may have at least one through hole 23, and the user can provide at least one fastener 60 (e.g., a screw, a bolt and the like) passing through the through hole 23 to fasten the document processing device 50 to the cover 20. Because the document processing device 50 has the considerable weight, the fastener 60 can fasten the document processing device 50 to the cover 20 firmly, so that the document processing device 50 still can be firmly mounted when the cover 20 is opened.

With the above-mentioned embodiment, the document scanning device has the detachable presser assembly and can provide different pressing backgrounds for the document(s) to make the subsequent image processing become easier, or provide pressing planes having different properties for the documents having different properties to adapt to different usage requirements. Furthermore, because the presser assembly can be disassembled, the document processing device can be disposed on the cover, then the presser assembly is disassembled, and then the document processing device is fastened to the cover to provide the firm mounting effect, and also make the document scanning device have the printing (or sheet-fed document scanning) function.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. A document scanning device, comprising:
   a flatbed scanner, which has a transparent platen for supporting a document, and performs flatbed scanning on the document;
   a cover, which is pivotally connected to the flatbed scanner and is openable and closeable relatively to the flatbed scanner; and
   a presser assembly detachably disposed on a lower surface of the cover, wherein the presser assembly has a first pressing plane and a second pressing plane opposite to each other, the cover and the presser assembly respectively have detachable docking structures disposed between the first pressing plane and the second pressing plane, so that a user can detach the presser assembly from the lower surface of the cover, or attach the presser assembly to the lower surface of the cover, and that the first pressing plane and the second pressing plane can directly press the document onto the transparent platen of the flatbed scanner in two different used states.

2. The document scanning device according to claim 1, wherein the presser assembly has a first background member and a second background member opposite to each other, so that the first background member or the second background member directly contacts the transparent platen and the document to selectively provide the first background member and the second background member, which are different from each other, for the document.

3. The document scanning device according to claim 2, wherein the presser assembly further has a buffer structure, and the first background member and the second background member are respectively attached to a first structure surface and a second structure surface of the buffer structure opposite to each other.

4. The document scanning device according to claim 3, wherein the buffer structure is partially accommodated within a slot of the second background member, the second structure surface is entirely accommodated within the slot, and the first structure surface is disposed outside the slot, so that the first background member and the second background member are separated from each other by a buffer gap.

5. The document scanning device according to claim 2, wherein the presser assembly further comprises a handle, which is disposed on one side of the second background member, so that the user detaches or attaches the presser assembly using the handle.

6. The document scanning device according to claim 1, further comprising a document processing device detachably disposed on an upper surface of the cover.

7. The document scanning device according to claim 1, further comprising an installation positioning portion being disposed on an upper surface of the cover and for positioning a document processing device to be installed.

8. The document scanning device according to claim 7, wherein the cover has at least one through hole, through which at least one fastener passes to fasten the document processing device to the cover.

9. The document scanning device according to claim 1, wherein the docking structures respectively comprise a shaft receiving slot and a shaft, wherein the shaft is engaged into the shaft receiving slot.

10. The document scanning device according to claim 1, wherein the docking structures respectively comprise a resilient hook and a groove, wherein the resilient hook is engaged into the groove.

11. The document scanning device according to claim 1, wherein the docking structures respectively comprise a positioning pin and a positioning hole of a lug, wherein the positioning pin is inserted into the positioning hole.

12. The document scanning device according to claim 1, wherein the first pressing plane and the second pressing plane can directly press the document onto the transparent platen of the flatbed scanner in the two different used states with the docking structures not touching the document and the transparent platen.

* * * * *